Feb. 3, 1959   W. B. BEHNEN   2,871,805
PLANTER
Filed July 18, 1956   2 Sheets-Sheet 1
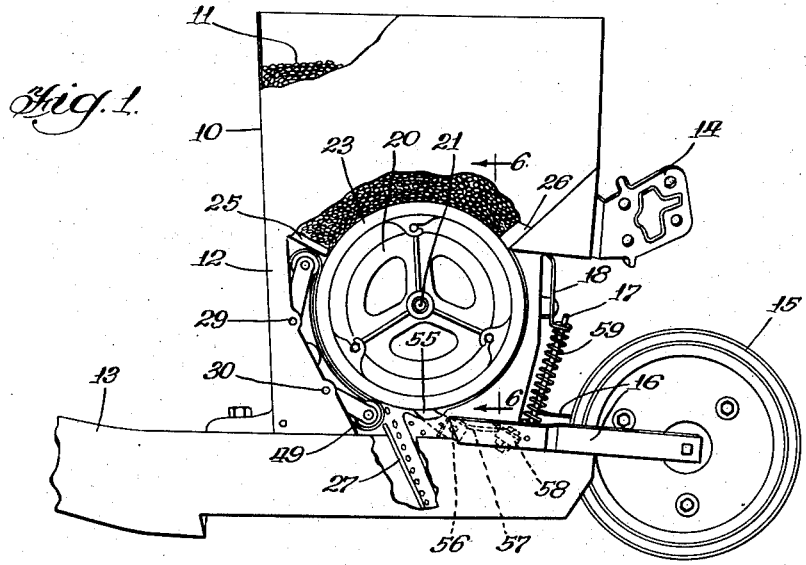
Fig. 1.
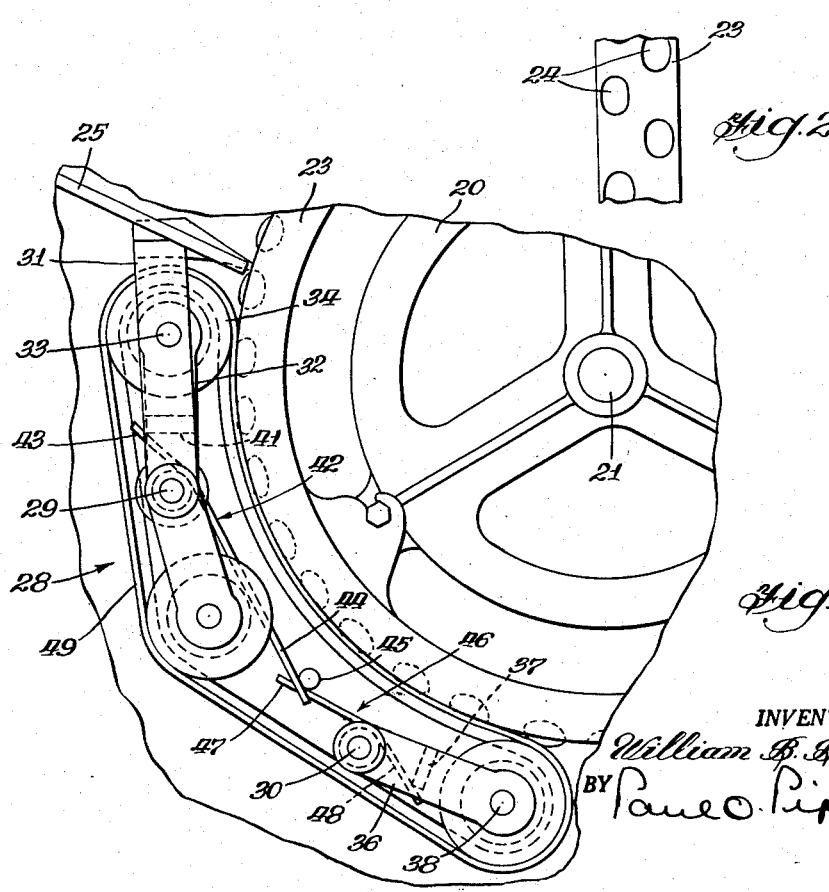
Fig. 2.
Fig. 3.
INVENTOR.
William B. Behnen
BY Paul O. Pippel
Atty.

Feb. 3, 1959 W. B. BEHNEN 2,871,805
PLANTER
Filed July 18, 1956 2 Sheets-Sheet 2
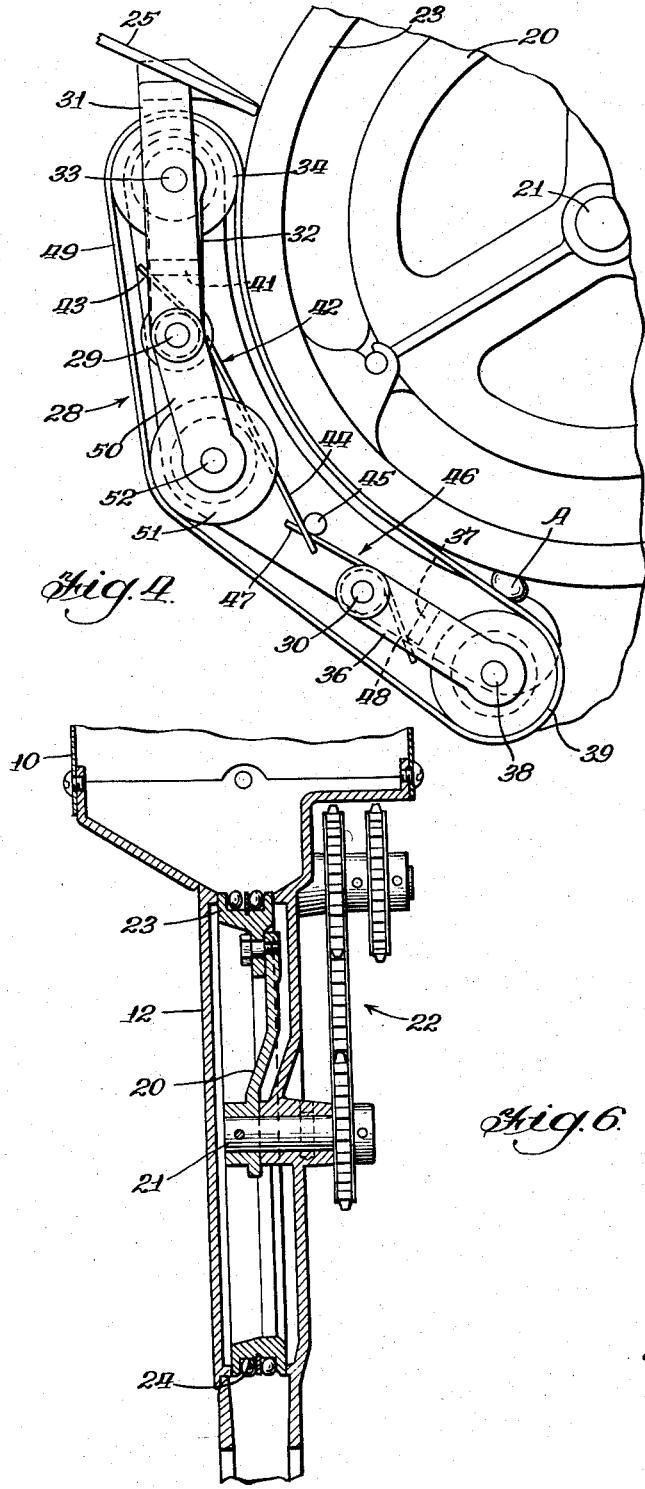
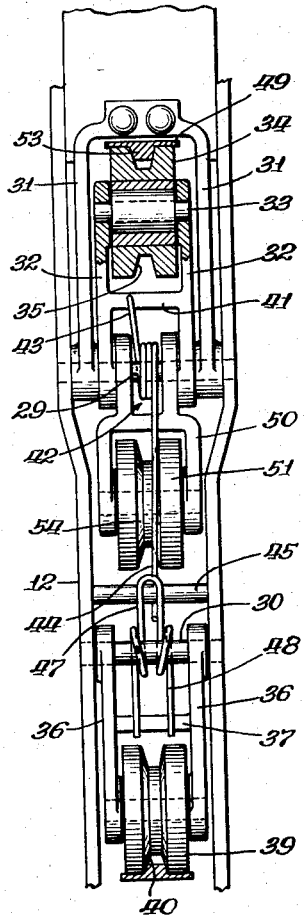
INVENTOR.
William B. Behnen
BY Paul O. Pippel
Atty

United States Patent Office 2,871,805
Patented Feb. 3, 1959

2,871,805

PLANTER

William B. Behnen, Richmond, Ind., assignor to International Harvester Company, a corporation of New Jersey Application July 18, 1956, Serial No. 598,688

2 Claims. (Cl. 111—77)

This invention relates to planters and particularly planters for corn and the like. More specifically the invention concerns a precision planter for dispensing seed in uniformly spaced drills in a furrow.

An object of the invention is the provision of improved planting means wherein seed in the supply hopper is taken therefrom by precision means and delivered one by one in uniformly spaced drills to the furrow formed by the earth penetrating tools.

Another object of the invention is the provision of precision planting means including a revolvable celled wheel which is rotatable with part of its circumference in contact with the seed in the hopper, each cell in the wheel being open to receive a single seed by gravity and rotatable to a position to allow the seeds to fall from the cells by gravity into the furrow.

A further object of the invention is the provision in a planter including a celled wheel rotatable on a horizontal axis with its upper portion rotating in the seed hopper to receive seed in the cells and discharge the seed therefrom when the wheel has revolved until the seeds are below the axis of the wheel so that they fall therefrom by gravity or are dislodged by scrapers and the like, of means between the hopper and the ground for retaining the seed in the cells until they have reached a selected discharge position.

Other objects and advantages of the invention will become clear from the following detailed description when read in conjunction with the accompanying drawings wherein:

Figure 1 is a view in side elevation, with parts broken away, of a planter unit incorporating the features of this invention and illustrating the relationship of the seed hopper, the revolving feed wheel, the endless belt device for holding the seed on the wheel, and the furrow opener with the passageway therein to guide seed into the furrow, and a press wheel for pressing seed into the furrow;

Figure 2 is a small detail of a portion of the periphery of the wheel showing the arrangement of seed cells therein;

Figure 3 is an enlarged detail of the retaining means for holding the seeds in the cells of the wheel;

Figure 4 is a view similar to Figure 3 but illustrating the manner in which the retaining means yields to accommodate passage of an obstruction such as a seed which was not received in a cell;

Figure 5 is a view, partly in section, of the retainer means with the endless belt removed to show the position of the rollers upon which the belt is trained; and Figure 6 is a section taken on the line 6—6 of Figure 1.

In the drawings, the hopper 10 is shown filled with seeds 11 and mounted upon a frame 12, to the lower end of which is secured an earth penetrating tool in the form of a runner furrow opener 13. A bracket 14 secured to the frame is provided for connection of the planter unit to a support, and a press wheel 15 is mounted between arms 16 suitably connected to the planter frame through the intermediary of a conventional spring-pressed rod 17 connected at its lower end to the arms 16 and slidable in an opening provided in a bracket 18 secured to the frame 12, accommodating floating movement of the wheel 15.

Between the hopper 10 and furrow opener 13 a rotary seed pickup and discharge wheel member 20 is provided and mounted for rotation on a horizontal transverse shaft 21 driven by any suitable planter drive means transmitted through a gear train such as that indicated at 22 in Figure 6.

The planter frame 12 provides a housing for the wheel 20 and is relatively narrow as indicated in Figures 5 and 6.

The periphery of the rim 23 of feed wheel 20 is provided with circumferentially spaced seed cells 24, two staggered rows of which are indicated in Figure 2, although it should be understood that the number of rows and the size of the seed cells will vary with the type of seed to be fed thereto.

In Figure 1 it will be observed that the upper portion of wheel 20 is received in an opening provided in the bottom of the hopper 10 and penetrates the mass of seed 11 in the hopper, the seed resting upon the periphery of the rim 23 and the individual seeds being picked up in the cells 24. The bottom of hopper 10 consists of front and rear slanted portions 25 and 26, respectively, which terminate adjacent the periphery of the feed wheel and prevent the escape of seed therefrom. Seed is then carried in the cells until they are below the axis of the wheel and are discharged by gravity at a location adjacent to passageway 27 provided in the runner 13.

In order to insure retention of the seeds in their cells until they can be discharged into the passageway 27, retaining means in the form of a roller and endless belt assembly generally indicated at 28 is provided. The roller and endless belt assembly 28 includes a pair of pivot pins 29 and 30 mounted in the frame 12. Pivot pin 29 is received in openings in the lower ends of a pair of laterally spaced straps 31, the upper ends of which are anchored to the bottom of the hopper 10. Also mounted upon pin 29 is a pair of laterally spaced arms 32, the upper ends of which carry a pin 33 upon which is mounted a roller 34 having a peripheral notch 35 therein for a purpose hereinafter to become clear.

The lower pivot bolt or pin 30 has mounted thereon a pair of laterally spaced arms 36, which extend downwardly and rearwardly and are connected by a crosspiece or brace 37 medially of their ends. The ends of arms 36 carry a shaft 38 upon which is rotatably mounted a roller 39 also provided with a central groove 40 similar to groove 35 in roller 34.

Arms 32 are connected by a cross brace 41, and a coil spring 42 wrapped about pin 29 has one end 43 thereof engaging brace 41 while the other end 44 is elongated and extends downwardly engaging a stop 45 mounted in the planter frame, as shown particularly well in Figures 3 and 4. Since arms 32 are mounted for swinging movement on the pivot bolt 29, the end portion 43 of spring 42 biases roller 34 in the direction of the wheel frame.

A coil spring 46 is wrapped around pivot bolt 30 and is provided with a central loop portion 47, engaging the stop peg 45, and a pair of end portions 48 engaging the cross brace 37 between arms 36 to urge roller 39 in the direction of the periphery of wheel 20.

An endless belt 49, of rubber or any other suitable material, is trained around upper and lower rollers 34 and 39 and the belt flight therebetween engages the periphery of wheel 20 and the seeds contained in the seed cells thereof, as indicated in Figure 3, the belt conforming to the contour of the wheel. The rollers 34 and 39 are biased toward the periphery of wheel 20 and the belt 49 maintained in engagement therewith by the action of springs 42 and 45, and the belt 49 is revolved around these rollers by the frictional engagement thereof with the celled seed wheel 20. Thus there is no relative motion, and consequent rubbing, between the endless belt and the periphery of the feed wheel so that there is no injury to the seeds such as would occur if the belt 49 were a stationary member. Likewise, the resilient mounting of the retainer assembly 28, and particularly of the rollers 34 and 39 accommodates yielding of the retainer unit away from the feed wheel to accommodate the passage of larger seeds than normal picked up by the seed cells, or a dislodged seed such as is indicated at "A" in Figure 4, avoiding injury to the seed.

The endless belt 49 is maintained under tension by the provision of an idler unit including a pair of arms 50 pivotally mounted upon the pivot bolt 29 and rotatably carrying a centrally grooved roller 51 mounted upon a pin 52 for free swinging around the axis of pin or bolts 29. Roller 51 is an idler which is engaged by the elongated arm 44 of spring 42 and is urged outwardly against the endless belt 49 to maintain the latter under tension. Endless belt 49 is provided with an inwardly projecting rib 53 which fits into the grooves 35 and 40 of rollers 34 and 39 as well as into the groove 54 of idler 51, to hold the belt in position on the rollers and prevent lateral displacement thereof.

The retainer assembly 28 holds the seeds in the pockets 24 of the feed wheel until the seeds have been revolved with the wheel to a location adjacent the passageway 27 in furrow opener 13, whereupon they fall by gravity into the passageway and to the furrow in the ground. A cut-off 55 is provided to engage the periphery of the wheel 20 in the path of the seeds in the cells thereof to prevent the seeds traveling with the wheel beyond the opening to the passageway 27. Cut-off 55 may be of any suitable form and is illustrated as mounted upon a pin 56 carried by the planter frame 12 and is biased to engagement with the periphery of the feed wheel by the provision of a spring 57 secured to the cut-off member 55 and projecting rearwardly therefrom in engagement with a stop 58 also mounted on the planter frame.

It has previously been noted that wheel 15 travels in the furrow formed by the earth penetrating tool 13. This wheel functions as a seed firming device which presses the seed into the furrow, and it is resiliently held to its work by the provision of a spring 59 acting in compression and surrounding rod 17.

The operation of the precision planting apparatus of this invention should be clearly understood from the foregoing description. It should likewise be understood that the invention has been described in its preferred embodiment only, and that modifications may be made therein without departing from the spirit of the invention or the scope of the appended claims.

What is claimed is:

1. In a planter, a frame, a seed hopper mounted on the frame, a wheel member rotatable on a horizontal axis below said hopper and having peripheral cells therein for the reception of seeds by gravity from the hopper, said member being rotatable to convey the seeds to a position to be discharged from said cells by gravity, a furrow opener mounted on the frame below said wheel, a passageway formed in said furrow opener extending to a location adjacent the lower portion of said wheel to receive seed discharged therefrom and guide it to the furrow formed by said furrow opener, and retainer means adjacent the wheel between the hopper and said passageway operative to retain the seeds in said cells comprising a pair of circumferentially spaced rollers, arms pivotally connecting said rollers to said frame for movement toward and away from said wheel member, an endless flexible belt trained on said rollers engaging and conforming to the curvature of said wheel member, and yieldable means biasing said rollers and said belt into engagement with the periphery of said wheel.

2. In a planter including a frame, a seed hopper mounted on the frame and a wheel member rotatable on a horizontal axis adjacent said hopper and having peripheral cells therein adapted to receive seeds from the hopper and convey them to a discharge point by rotation of the wheel, the combination of means for confining the seed in said cells between the seed-receiving and discharge points, comprising a pair of pivot members carried by the frame at circumferentially spaced locations with respect to said wheel, an arm mounted at one end on each of said pivot members and carrying a roller at its other end, spring means acting between said pivot members and the respective of said arms to yieldably urge the rollers toward the wheel, an endless belt trained around said rollers in engagement with the periphery of said wheel, another arm pivoted to the frame and carrying an idler roller at its free end, and spring means acting between one of said pivot means and said idler roller to urge the latter away from said wheel and into engagement with said belt to maintain the latter under tension.

References Cited in the file of this patent

UNITED STATES PATENTS

| | | |
|---|---|---|
| 717,360 | Dement | Dec. 30, 1902 |
| 2,496,885 | Milton | Feb. 7, 1950 |
| 2,605,023 | Ward | July 29, 1952 |
| 2,684,781 | Allen et al. | July 27, 1954 |
| 2,742,192 | Ward | Apr. 17, 1956 |
| 2,808,181 | Oehler et al. | Oct. 1, 1957 |

FOREIGN PATENTS

| | | |
|---|---|---|
| 505,948 | Belgium | Oct. 15, 1951 |
| 272,762 | Switzerland | Apr. 2, 1951 |